(12) United States Patent
Fontecha et al.

(10) Patent No.: US 6,857,790 B2
(45) Date of Patent: Feb. 22, 2005

(54) APPARATUS AND METHOD TO VERTICALLY ROUTE AND CONNECT MULTIPLE OPTICAL FIBERS

(75) Inventors: Edwin Fontecha, San Jose, CA (US); Mohammad Zubair Khan, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 251 days.

(21) Appl. No.: 09/904,163

(22) Filed: Jul. 11, 2001

(65) Prior Publication Data

US 2002/0028056 A1 Mar. 7, 2002

Related U.S. Application Data

(63) Continuation-in-part of application No. 09/724,829, filed on Nov. 28, 2000, now abandoned, which is a continuation-in-part of application No. 09/654,459, filed on Sep. 1, 2000, now abandoned.

(51) Int. Cl.[7] ............................. G02B 6/40; G02B 6/42
(52) U.S. Cl. ............................ 385/92; 385/88; 385/139
(58) Field of Search ...................... 385/88–94, 134–139

(56) References Cited

U.S. PATENT DOCUMENTS

| | | | |
|---|---|---|---|
| 4,346,294 A | 8/1982 | Albaugh et al. | |
| 4,690,492 A | 9/1987 | Beard | |
| 4,976,510 A | 12/1990 | Davila et al. | |
| 5,064,268 A | 11/1991 | Morency et al. | |
| 5,420,954 A | 5/1995 | Swirhun et al. | |
| 5,420,958 A | 5/1995 | Henson et al. | |
| 5,436,997 A | 7/1995 | Makiuchi et al. | |
| 5,513,293 A | 4/1996 | Holland et al. | |
| 5,590,232 A | 12/1996 | Wentworth et al. | |
| 5,613,030 A | 3/1997 | Hoffer et al. | |
| 5,631,988 A * | 5/1997 | Swirhun et al. | 385/89 |
| 5,742,982 A | 4/1998 | Dodd et al. | |
| 5,790,733 A | 8/1998 | Smith et al. | |
| 5,881,198 A | 3/1999 | Haake | |
| 5,940,562 A | 8/1999 | Henson et al. | |
| 5,944,949 A | 8/1999 | Mock | |
| 5,978,540 A | 11/1999 | Bechamps et al. | |
| 6,447,174 B1 * | 9/2002 | Trezza | 385/89 |
| 6,459,842 B1 * | 10/2002 | Arsenault et al. | 385/134 |
| 6,498,882 B1 * | 12/2002 | Buckelew et al. | 385/114 |
| 2002/0126962 A1 * | 9/2002 | Kadar-Kallen et al. | 385/88 |

FOREIGN PATENT DOCUMENTS

| | | |
|---|---|---|
| EP | 0 690 322 | 1/1996 |
| EP | 0 860 721 | 8/1998 |
| FR | 2 745 431 | 8/1997 |
| JP | 56080012 | 7/1981 |
| JP | 2000227530 | 8/2000 |
| JP | 2000227532 | 8/2000 |

OTHER PUBLICATIONS

U.S. Appl. No. 09/654,459, filed Sep. 1, 2000, Khan et al.
U.S. Appl. No. 09/724,829, filed Nov. 28, 2000, Fontecha et al.
U.S. Appl. No. 09/887,367, filed Jun. 21, 2001, Khan et al.

* cited by examiner

Primary Examiner—Michelle R. Connelly-Cushwa
(74) Attorney, Agent, or Firm—Morrison & Foerster LLP

(57) ABSTRACT

An apparatus and method to vertically route and physically pass multiple optical fibers through the walls of a package. One variation is a method to route an optical fiber ribbon through a wall of a package by routing and securing the width of the optical fiber ribbon perpendicularly to a component within the package. Another variation involves a package having an enclosure with an opening through which a group of optical fibers are arrayed in a rectangular cross-section with a width which is longer than a thickness. The package includes a component inside the enclosure, a group of optical fibers routed through the opening to the component where the width of the rectangular cross-section is perpendicularly oriented to the base of the enclosure, and a clamp to secure the width of the rectangular cross-section of the group of optical fibers perpendicularly to the base of the enclosure.

38 Claims, 10 Drawing Sheets

APPARATUS AND METHOD TO VERTICALLY ROUTE AND CONNECT MULTIPLE OPTICAL FIBERS

This application claims the benefit of priority to co-pending U.S. patent application Ser. No. 09/724,829 (now abandoned), entitled "APPARATUS AND METHOD TO VERTICALLY ROUTE AND CONNECT MULTIPLE OPTICAL FIBERS" filed on Nov. 28, 2000, end to co-pending U.S. patent application Ser. No. 09/887,367 entitled "APPARATUS AND METHOD TO METALLIZE, REINFORCE, AND HERMETICALLY SEAL MULTIPLE OPTICAL FIBERS" filed on Jun. 21. 2001 which are both continuation-in-part of U.S. patent application Ser. No. 09/654,459 (now abandoned), entitled "APPARATUS AND METHOD TO METALLIZE, REINFORCE, AND HERMETICALLY SEAL MULTIPLE OPTICAL FIBERS" filed on Sep. 1, 2000. each of which is hereby incorporated by reference in its entirety.

FIELD OF THE INVENTION

This invention relates generally to an apparatus and method to physically pass multiple optical fibers (e.g., a ribbon) through the walls of a package (e.g., a rectangular enclosure), and more specifically to an apparatus and method to route and physically connect a ribbon of optical fibers through a wall of a package such that the plane of the ribbon is perpendicular to a mounting surface of the package or to a plane of a component to which the ribbon is connected.

BACKGROUND OF THE INVENTION

In many optical and electro-optical systems (e.g., computer systems, programmable electronic systems, telecommunication switching systems, control systems, and so forth) the reliable physical passing of multiple optical fibers through the walls of a package (e.g., a rectangular enclosure with one or more components) is desired, where the fibers transition between the inside and outside of a package.

Such packages are typically populated with components that are disposed upon a plane. For instance, a planar waveguide circuit may be formed on the surface of a section of a silicon wafer, and this surface is the nominal plane of this optical component. The optical components are typically placed within the package so that the planes of the optical components are parallel to the larger-area top and bottom sides of the package, and the components are spaced away from the sides along the height of the package.

One solution for physically routing one or more optical fibers through a wall of a package is to bundle the optical fibers into a cable, e.g., conventionally manufactured lines having a diameter, and route the optical fiber cable through a package wall opening. Another solution for physically routing one or more optical fibers through a wall of a package is to bundle the optical fibers into flat ribbons, and route the flat ribbons through package wall openings in a horizontal orientation. The ribbon orientation is considered to be horizontal if the plane of the ribbon is parallel to the planar waveguide circuit inside the package enclosure.

Additionally, for a typical installation of fiber optic-connected component in such a package, the fibers must be bent in order to connect to other components in the installation. In practice, fiber ribbons are bent only out of the plane of the ribbon. The other components are typically displaced primarily in the plane parallel to the bottom of the package, and it is desirable to route the fibers nominally in that same plane. For a ribbon of optical fibers in a horizontal orientation, the ribbon must frequently be twisted 90 degrees in orientation to rotate the plane of the fibers perpendicular to the plane of the installation. This rotation will then provide the desired ability to physically route the ribbon parallel to the plane of the installation. A very tightly twisted ribbon puts extra stress on the optical fibers and the connection points of the optical fibers. There are physical limitations on how tightly the ribbon can be twisted and how small the bend radius of curvature of the ribbon can be, since twists and bends increase the optical loss along the length of the optical fibers. Bends and twists typically require several millimeters to a few centimeters of fiber length to assure low loss and acceptably low stress. These limitations on the ribbon twisting and bending can also increase the clearance required for the package in the system, and increase the spacing between packages in a system.

FIG. 1 illustrates a top view of a prior art approach for routing optical fibers through a wall of a package in an optical system 100. Optical system 100, as shown in this example, includes six horizontally oriented optical fiber ribbons 102, 103, 104, 105, 106, and 107 routed through the wall 108 of a package 110. Here, the wall 108 must be wide enough for the entry of the three top optical fiber ribbons 102, 104, and 106, and the three bottom optical fiber ribbons 103, 105, and 107. Additional optical fiber ribbons would require a package 110 with a wider wall 108.

It would be desirable to physically route multiple optical fibers in a bundled (e.g., ribbon) configuration through a wall of a package, with a reduction in package size. It would also be desirable to provide an apparatus and method to reduce the stress on optical fibers by reducing the twisting of an optical fiber ribbon physically connected to an external system.

SUMMARY OF THE INVENTION

An apparatus and method to vertically route and physically pass multiple optical fibers through the walls of a package, e.g., an optical package, is described herein. One variation of a method to route an optical fiber ribbon through a wall of a package may comprise routing the ribbon such that the width of the optical fiber ribbon is secured perpendicularly to a component within the package to which the ribbon is attached.

Another variation may involve a package having an enclosure with an opening through which a group of optical fibers may be arrayed in a rectangular cross-section having a width which may be longer than a thickness. The width is defined as the overall distance formed from each of the cross-sections of the juxtaposed individual fibers along one direction and the thickness is defined as the distance perpendicular to the width. Alternatively, the group of optical fibers may be arrayed in other configurations, e.g., oval cross-sections, elliptical, etc. The package may include a component disposed inside the enclosure, and a group of optical fibers may be routed through the opening to the component. The group of optical fibers may have a rectangular cross-section where a width may be perpendicularly oriented to the base of the enclosure, and a clamp may be used to secure the width of the rectangular cross-section of the group of optical fibers preferably perpendicularly to the base of the enclosure. The base of the enclosure is defined as that part of the enclosure which may be secured or placed in contact with a mounting surface.

Where the ribbon may be routed through an opening in the wall, the orientation of the ribbon may be such that the fibers of the ribbon may optimally exit the package to provide a minimal bend radius of the ribbon, thereby preferably providing an apparatus and method to reduce the stress on the fibers by reducing the twisting of the ribbon. The ribbon of optical fibers routed through the wall of a package may also be secured by, e.g., a clamp, along a width of the ribbon.

The ribbon may be looped and oriented within the package such that the end of the ribbon not attached to the component becomes oriented vertically, i.e., perpendicularly, in relation to a plane defined by a component which may be disposed within the package and to which the opposite end of the ribbon is attached. Moreover, where the plane of the component is parallel to the mounting base, vertical may be taken as the direction perpendicular to the plane of the mounting base of the package. As further defined herein, the term "vertically" shall be used to describe an orientation as being perpendicular to the plane defined by a component within the package, unless otherwise noted. Likewise, the term "horizontally" shall be used to describe an orientation as being parallel to the plane defined by the component which may be disposed within the package, or parallel to the mounting base of the package when parallel to the plane of the component, also unless otherwise noted.

The invention, together with its various features and advantages, can be readily understood from the following more detailed description taken in conjunction with the accompanying figures, in which the figures are schematic and have not been drawn to scale in the interest of clarity.

DETAILED DESCRIPTION OF THE INVENTION

Figure 1:
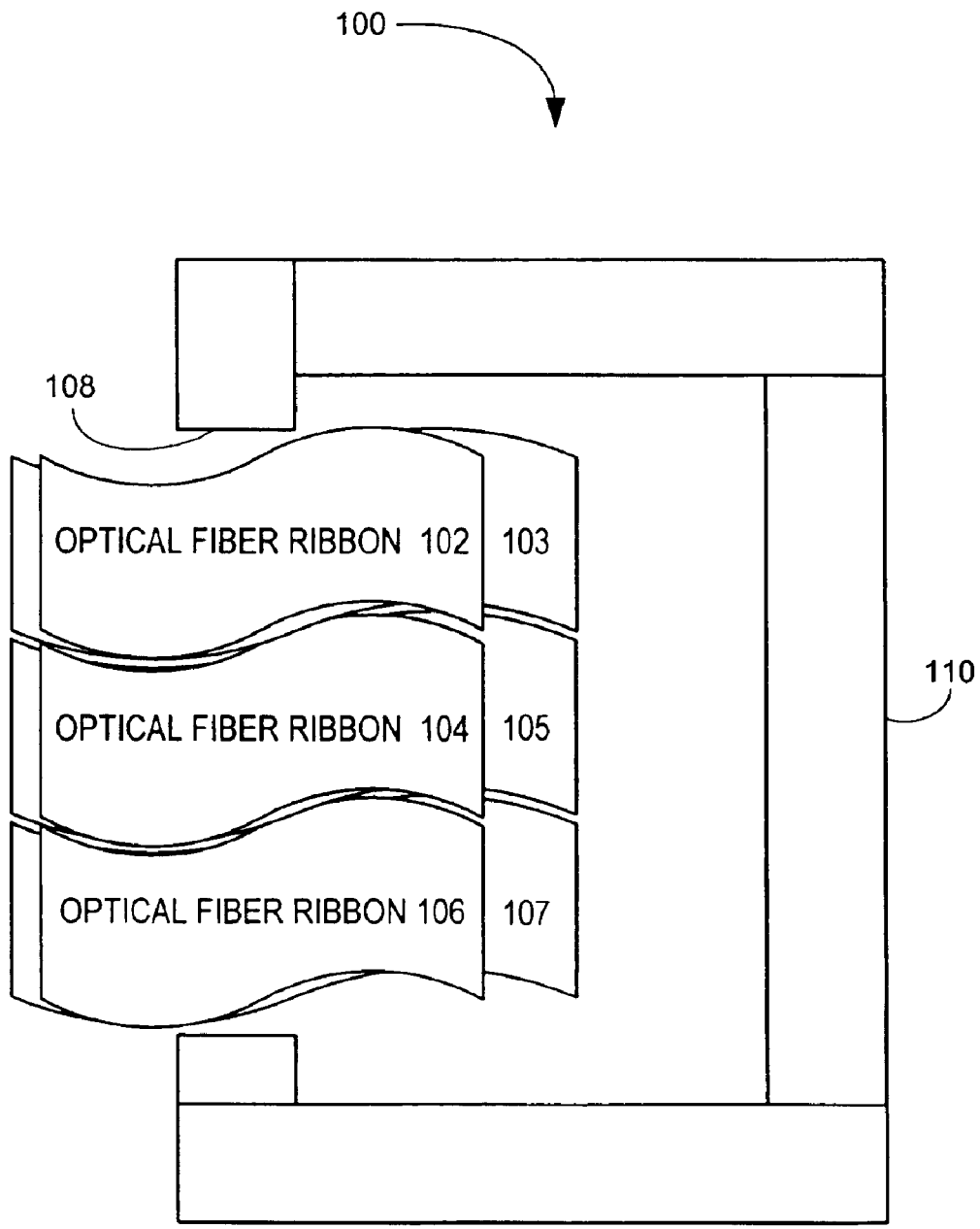
FIG. 1 illustrates a top-down view of a prior art approach for routing optical fibers through a wall of a package in an optical system.

This invention provides an apparatus and method to pass a ribbon of optical fibers or a similar cable through a wall of a package such that the fibers of the ribbon or cable may optimally exit the package to provide a minimal bend radius to the ribbon or cable. The invention also provides an apparatus and method for securing the optical ribbon or cable to the package in this desired orientation. A preferable variation may route multiple optical fibers in a planar cable (e.g., a ribbon) through a package wall opening that is some distance from the connection of the optical fibers to a component inside the package. Furthermore, in alternative variations, multiple optical fibers may be bundled in a cable other than a simple ribbon, e.g., oval, elliptical, etc., such as a multi-layered ribbon or a matrix configuration with a rectangular cross-section having a thickness and a width typically greater than the thickness. The width is defined as the overall distance formed from each of the cross-sections of the juxtaposed individual fibers along one direction and the thickness is defined as the distance perpendicular to the width.

A package may comprise a variety of shapes and may typically be rectangular. The package may have a mounting base which is usually mounted upon and contacting some surface depending upon the environment and configuration of the system into which the package may be placed. The base of the enclosure is defined as that part of the enclosure which may be secured or placed in contact with a mounting surface. Within the package, various components, e.g., a planar waveguide circuit formed on the surface of a section of a silicon wafer, are usually mounted such that the plane of the optical components may be parallel with the mounting base or mounting surface upon which the package is placed. A ribbon optically connected to such a component is typically parallel with the plane of the component. The end of the ribbon not attached to the component may be looped and oriented within the package such that the ribbon becomes oriented at an angle, i.e., vertically, in relation to a plane defined by a component which may be disposed within the package. The angle formed is preferably about 90° or perpendicular. This relationship may hold regardless of how many twists the ribbon may endure so long as the end of the ribbon connected to the component and the end of the ribbon exiting the package maintain their perpendicular relationship.

Moreover, where the plane of the component is parallel to the mounting base, vertical may be taken as perpendicular to the mounting base of the package. As further defined herein, the term "vertically" shall be used to describe an orientation as being perpendicular to the plane defined by a component which may be disposed within the package, unless otherwise noted. Likewise, the term "horizontally" shall be used describe an orientation as being parallel to the plane defined by the component which may be disposed within the package, or parallel to the mounting base of the package if parallel to the plane of the component, also unless otherwise noted.

Alternatively, if a component were mounted such that the plane of the component were perpendicular to the mounting base of the package and the mounting surface, the connected ribbon may be looped and oriented such that the plane of the ribbon still exits the package vertically, i.e., perpendicular to the mounting base or mounting surface, despite the orientation of the component within the package.

Figure 2:
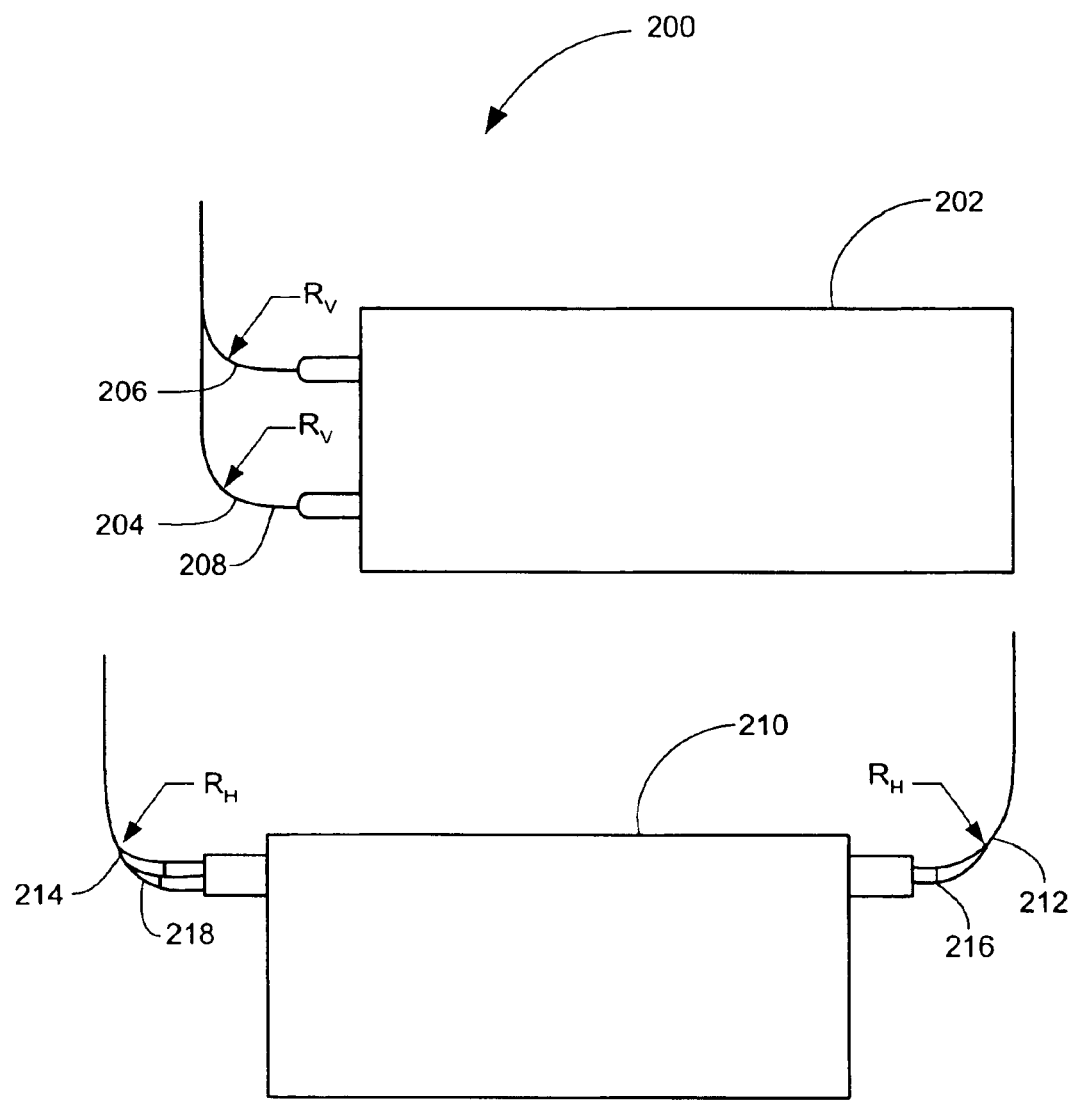
FIG. 2 illustrates a top-down view comparison of a package having a horizontal optical fiber ribbon (bottom package) and a package having a vertical optical fiber ribbon passing through and bending (top package).

FIG. 2 illustrates a top-down view comparison 200 of a variation on a package 202 having a vertically-routed, i.e., preferably perpendicular to the mounting surface or mounting base, input fiber ribbon 204 and output fiber ribbon 206. As vertically-routed fiber ribbons 204, 206 bend, they typically form a bend radius, $R_V$. An example of such a bend radius, $R_V$, for a typical ribbon may be about 1.0 in. (25.4 mm). For comparison purposes, a top-down view of conventional package 210 is shown having a conventional horizontally routed, i.e., parallel to the mounting surface or mounting base, input fiber ribbon 212 and output fiber ribbon 214.

As conventionally-routed ribbons 212, 214 bend, they may also typically form a bend radius, $R_H$. An example of such a bend radius, $R_H$, for a typical ribbon may be about 1.0 in. (25.4 mm). Bend radius, $R_H$, is shown in the figures as being outside the packages to illustrate some of the desirable results, e.g., less space required for connecting different packages together, of vertically routing the ribbon as compared to conventional methods. As seen, conventionally routed ribbons 212, 214 may require a longer length of non-bending fiber 216, 218 than a length of non-bending fiber 208 for the vertically routed ribbon. An example of a typical length of non-bending fiber 216, 218 may about 0.25 to 0.5 in. (6.35 to 12.7 mm) whereas an example of a length of non-bending fiber 208 for the vertically routed ribbon may be about 0.1 in. (2.54 mm). Here, both vertically-routed fiber ribbons 204, 206 and conventionally routed ribbons 212, 214 may be routed to another package (not shown) and externally connected in a vertical orientation. An overall result is that conventionally routed ribbons 212, 214 requiring a considerably larger amount of space to twist and bend compared to vertically-routed fiber ribbons 204, 206. A smaller amount of space for optical fiber ribbon bending is desirable for permitting the fabrication of a more compact and lower cost system.

Another advantage of the present invention can be seen in FIG. 2 in that vertically routing the ribbon may allow vertically-routed ribbons 204, 206 to enter and exit the same side of the package 202 due to the efficient vertical routing within package 202. On the other hand, conventional methods of routing may require an input ribbon 212 on one side of package 210 and an output ribbon 214 on an opposite side of package 210 due to the required additional space necessary to route and connect the ribbon within package 210. As clearly seen, access to package 202 from a single side may allow for efficient placement and connection of package 202 to other packages as well as overall space savings and compact design.

Physical clamping and reinforcement may be facilitated by the extension of optical fibers through a wall of a package. The optical fiber ribbon may be clamped on the outside of the package wall opening and/or on the inside of the package wall opening by a reinforcement support. In one variation, the optical fibers may be routed through a package wall opening and may be physically reinforced in a vertical orientation. Reinforcement may be provided by a vertical clamp (e.g., flat-faced or curved) with the face or face tangent parallel to the plane of the ribbon. The face tangent is taken to be the tangential portion of the curved face of the clamp which is parallel to the plane of the ribbon to which the clamp is securing. Preferably, the clamp may have a surface with a compliant material disposed thereon (e.g., a self-adhesive semi-rigid rubber strip). One preferred semi-rigid rubber strip may be approximately 30 mils (approximately 0.08 centimeters) thick with a durometer hardness of Shore A30, and may be commercially available from McMaster-Carr Supply Company, with corporate headquarters located in Los Angeles, Calif. Other variations may use other equivalent compliant materials, with or without adhesive, having a durometer hardness greater or smaller than Shore A30, and a greater or lesser thickness than approximately 30 mils (0.08 cm).

Other variations may provide a feedthrough or conduit, e.g., made from an aluminum alloy, other metals, or other strong materials, attached externally to the package wall opening to function as a gasket for the fiber feedthrough. This gasket may be used to provide physical support, and may help to transfer to the package external stresses induced on the fibers. The gasket in one preferred embodiment may be back-filled with an adhesive around the fibers to further seal the feedthrough volume. In another variation, a protective boot, i.e., an external covering around the fiber-to-package junction, preferably made from synthetic rubber, e.g., santoprene, neoprene, ethylene propylene diene monomer (EPDM), or other equivalent thermoset or thermoplastic polymeric materials, may cover the hard gasket providing an extended, composite gasket. The composite gasket may provide additional compliant physical support to the optical fibers.

Figure 3:
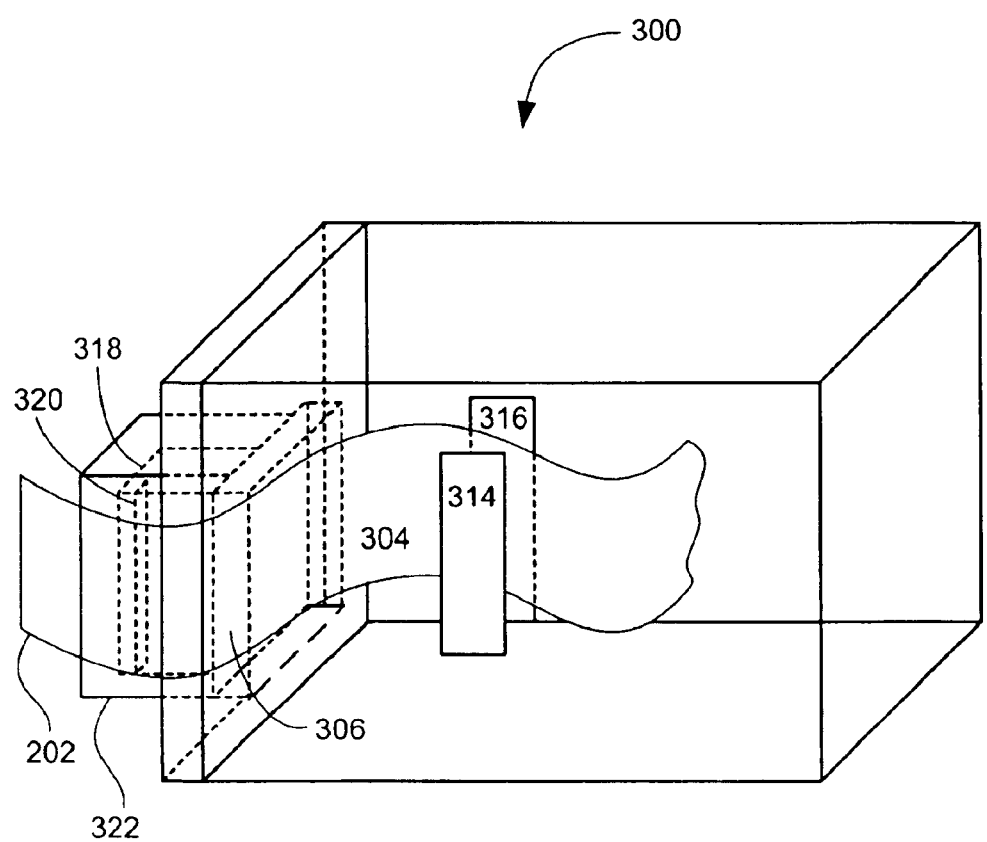
FIG. 3 illustrates a perspective side view of one preferred embodiment of the invention, showing a ribbon of optical fibers with a ribbon segment vertically routed through a package wall opening.

FIG. 3 illustrates a perspective view of one variation, showing a ribbon 202 of optical fibers with a ribbon segment 304 vertically routed through a package wall opening 306 to a component 312 (seen in FIG. 6). In this variation, the vertical clamps 314 and 316 may clamp either or both sides of the ribbon segment 304. The vertical clamps 314 and 316 are preferably made from an aluminum alloy, but can be made from other metals, polymers, or rubber in other variations. The external feedthrough or conduit 318, as described above, may be externally attached over the package wall opening 306 and may provide physical support to the optical fiber ribbon 202. The external feedthrough 318 is preferably comprised of a material such as an aluminum alloy, but can be fabricated from other metals or rigid materials in alternative variations. The external feedthrough 318 preferably extends about 250 to 500 mils (0.635 to 1.27 cm) beyond the outer wall of the package wall opening 306. Alternative variations can use a shorter or longer external feedthrough 318. In this preferable variation, a tight-fitting protective boot 322 made of a compliant material may cover the external feedthrough 318.

A gap may exist between the package wall opening and the optical fibers that may be routed through the opening. The gap may be filled with various low viscosity adhesives, e.g., various epoxy adhesives, silicone rubber adhesives, and so forth, in a preferable variation. The feedthrough cavity may be filled with various soft adhesives, e.g., various epoxy adhesives, silicone rubber adhesives, and so forth, or hard adhesives, e.g., anhydride epoxy adhesives, and so forth, for physical support for the ribbon and improved moisture-resistance for the package in more preferred variations.

Figure 4:
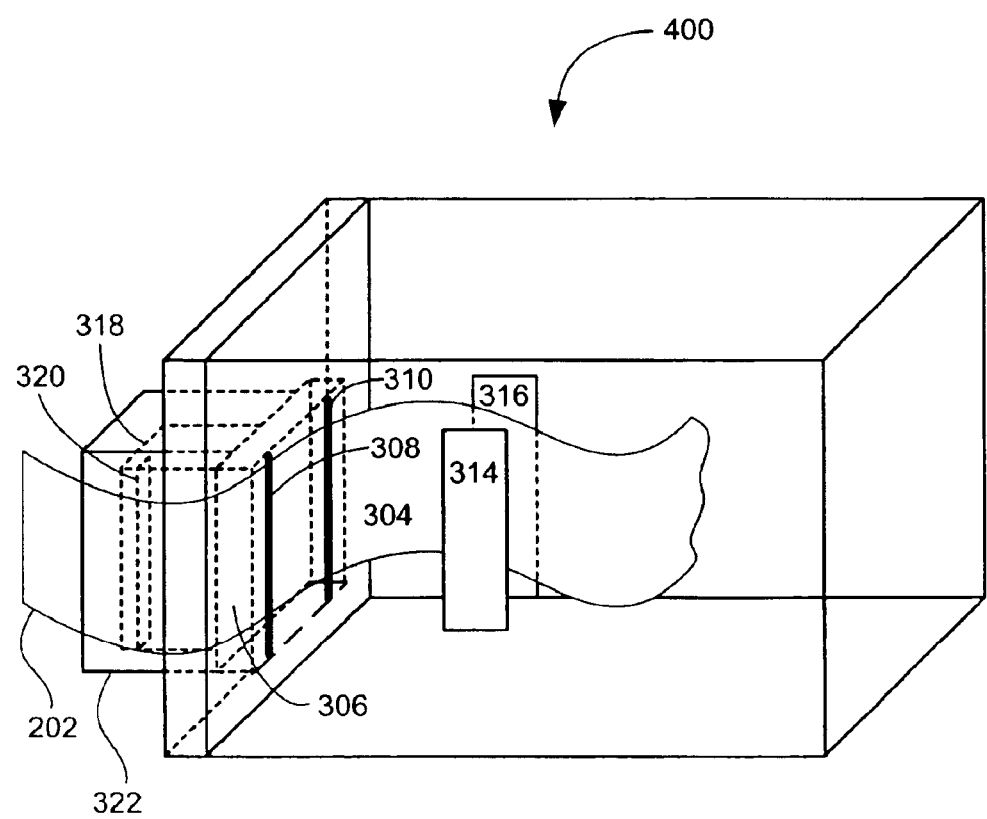
FIG. 4 illustrates a perspective view of another preferred embodiment of the invention, showing the ribbon of optical fibers with the ribbon segment vertically routed through the package wall opening. In this variation, the ribbon segment may be attached and sealed to the package wall opening by adhesive depositions.

FIG. 4 illustrates a perspective view of another preferable variation showing ribbon 202 of optical fibers with ribbon segment 304 vertically routed through package wall opening 306 to component 312 (as seen FIG. 6). In this variation, the ribbon segment 304 may be attached and sealed to the package wall opening 306 by adhesive depositions 308 and 310, e.g., epoxy or silicone rubber, which may fill the entire package wall opening 306. Vertical clamps 314 and 316 may clamp the ribbon segment 304. The ribbon 202 may be routed through external feedthrough 318, which may be attached to the outer wall of the package wall opening 306. In this preferable variation, a soft or hard epoxy adhesive, or a silicone rubber adhesive may seal the external feedthrough cavity 320. In this preferable variation, a tight-fitting protective boot 322 made of a compliant material may cover the external feedthrough 318.

The package wall openings through which optical fibers are routed from the interior of the package to the exterior of the package can be hermetically sealed by deposition of a solder. If a solder is used to hermetically seal a package wall opening, the most preferred solder is an Indium or Indium-alloy solder. Indium and Indium-alloy solders are available from Indium Corporation of America, with corporate headquarters located in Utica, N.Y. Indium and Indium-alloy solders are also available from Arconium, with corporate headquarters located in Providence, R.I.

In another preferable variation using a solder sealant, e.g. various alloya of Indium solder, for harmetic sealing, the optical fibers cables may be routed through a package wall opening vertically and may also be physically reinforced in a lateral direction by a reinforcement plate extending through the package wall opening, attached to the ribbon of optical fiber and the package wall opening by a solder, as discussed in more detail by co-pending U.S. patent application Ser. No. 09/654,459 (now abandoned), entitled "Apparatus and Method to Metallize, Reinforce, and Hermetically Seal Multiple Optical Fibers" filed on Sep. 1, 2000. It is also discussed in further detail in the co-pending U.S. patent application Ser. No. 09/887,367 also entitled "Apparatus and Method to Metallize, Reinforce, and Hermetically Seal Multiple Optical Fibers", which was filed on Jun. 21, 2001 as a continuation-in-part application of 09/654,459 (now abandoned). Each of the application is assigned to the same assignee and each is incorporated herein by reference in its entirety.

One preferable variation of the invention may use 99.99% pure Indium solder to coat the reinforcement plate and seal optical fibers to each package wall opening. However, alternative variations of the invention may use 99.9% pure Indium, 99% Indium, various alloys of Indium (including Lead, Silver, or Palladium), or even alternative low temperature solder alloys of Bismuth, Lead, or Tin. Another preferred variation may use 80% Indium, 15% Lead, and 5% Silver solder to coat the reinforcement plate and seal optical fibers to each package wall opening. Another preferred variation may use 97% Indium and 3% Silver solder to coat the reinforcement plate and seal optical fibers to each package wall opening. A less preferred variation may use 95% Indium and 5% Bismuth solder.

Most preferably, the solder may be protected from moisture-induced corrrosion by an outer covering of water-resistant epoxy, e.g., anhydride epoxy, in the feedthrough cavity, as described further in U.S. patent application Ser. No. 09/654,459 (now abandoned). The most preferred variation may use anhydride epoxy for the outermost adhesive in the feedthrough cavity. A preferred epoxy is available from Dexter, with corporate headquarters located in City of Industry, Calif.; Namices, with corporate headquarters located in Tokyo, Japan; and Ablestik, with corporate headquarters located in Rancho Dominques, Calif. Alternative variations may use other types of adhesives besides epoxy, e.g., silicone rubber compounds, polymer adhesives, and equivalents. The preferred adhesive is a thermally cured edhesive, but alternative variations may use an adhesive cured by ultraviolet light. A preferred epoxy dispenser is available from EFD) Dispenser, with corporate headquarters located in East Providence, R.I. However, other epoxy dispensers are available from other suppliers to dispense epoxy to implement the invention.

Figure 5A:
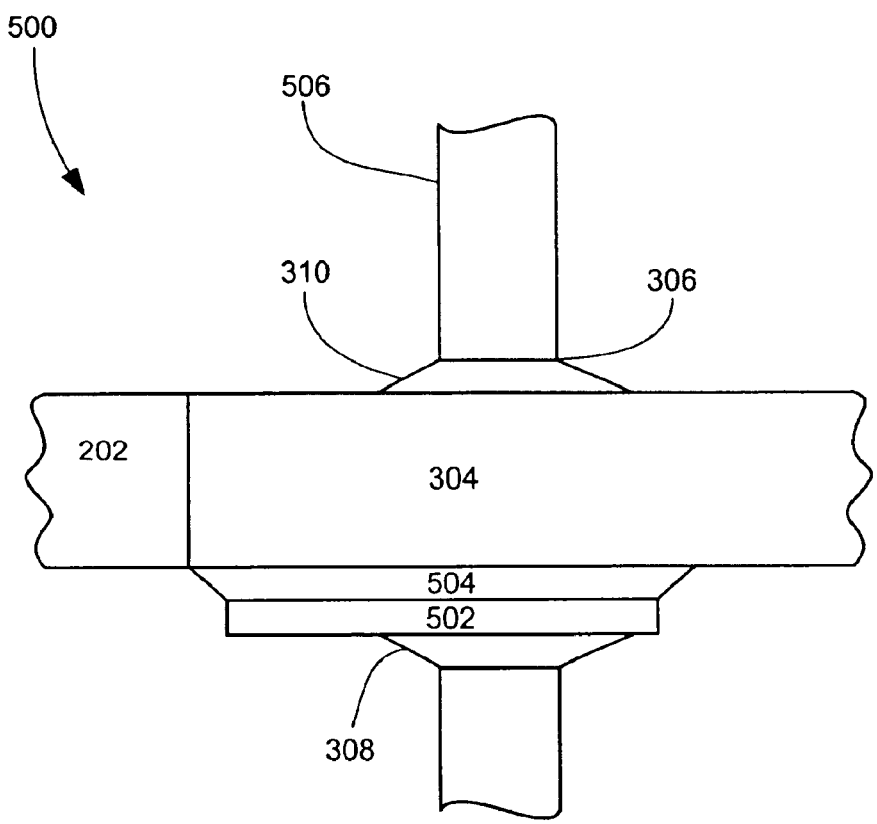
FIG. 5A illustrates a top-down (edge-on) view of a ribbon of one preferable variation having a reinforcement plate attached to a ribbon segment of a ribbon of optical fibers.
Figure 5B:
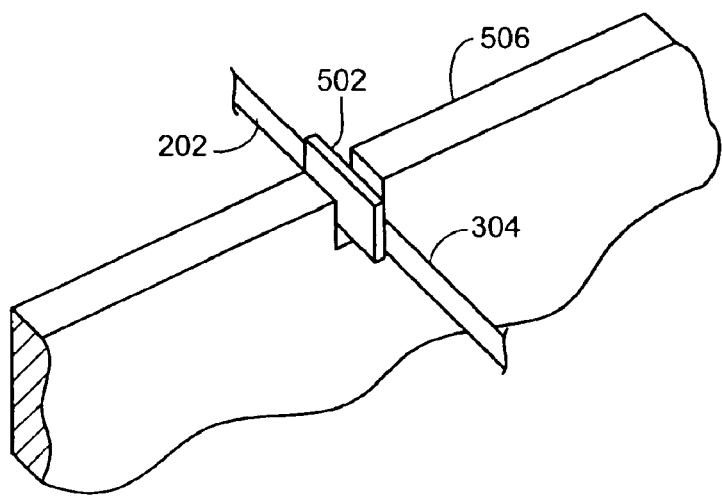
FIG. 5B illustrates an isometric view of the section from FIG. 5A with only the ribbon and reinforcement plate shown for clarity.

FIG. 5A illustrates a cross-sectioned top view 500 of one preferable variation with a reinforcement plate 502 attached to a vertically-routed ribbon segment 304 (seen as a top edge-view) of a ribbon 202 of optical fibers. FIG. 5B illustrates an isometric view of the section of FIG. 5A with only the ribbon 304 and reinforcement plate 502 shown for clarity. The ribbon segment 304 may be attached to the reinforcement plate 502 by solder deposit 504 for lateral support. The reinforcement plate 502 may also extend through the package wall opening 306. The reinforcement plate 502 preferably extends about 10 to 150 mils (0.0254 to 0.381 cm) outside the outer wall of the package 506. Alternative variations of the invention may make the reinforcement plate 502 extend about 50 to 250 mils (0.127 to 0.635 cm), or more than about 250 mile (0.635 cm), beyond the outer wall of the package 506. The ribbon segment 304 may be attached and sealed to the package 506 by solder depositions 308 and 310. A process for reinforcing and routing through opening 306 is described further in U.S. patent application Ser. No. 09/654,459 (now abandoned).

Figure 6A:
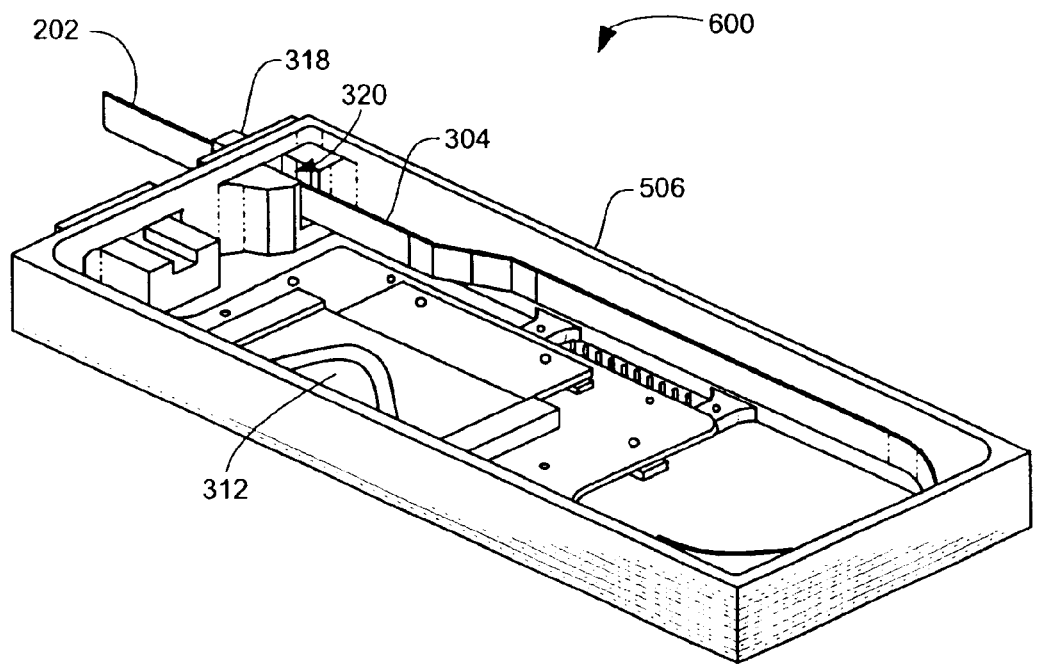
FIG. 6A illustrates an isometric view of a package having a component disposed within and a ribbon oriented vertically in relation to the component. The lid is not shown for clarity.
Figure 6B:
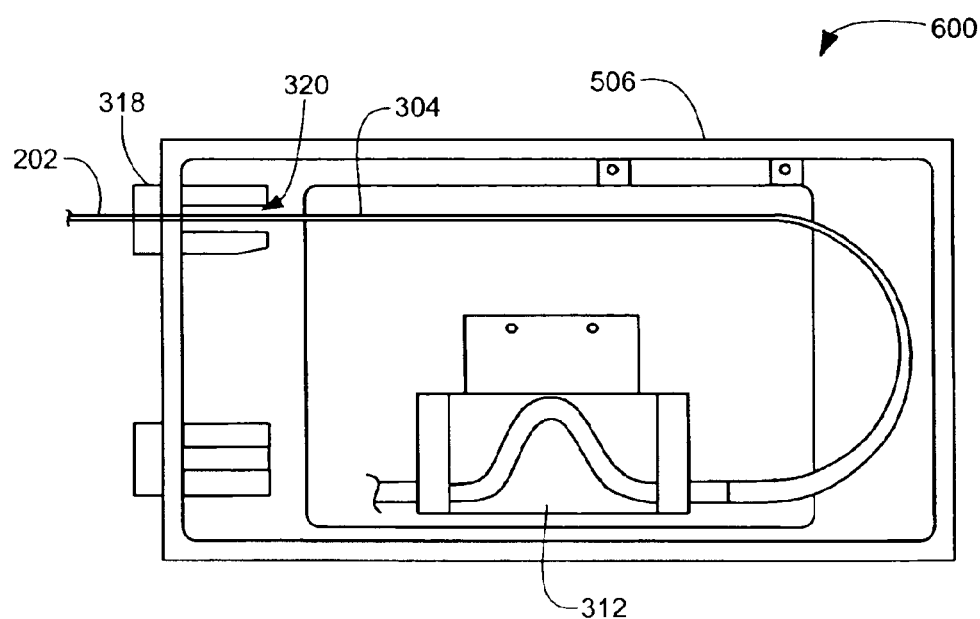
FIG. 6B illustrates a top view of the package of FIG. 6A showing the orientation of the ribbon in relation to the component.

FIG. 6A shows an isometric view of an example of a package 506 (with the lid removed for clarity) with ribbon 202 routed through feedthrough cavity 320 of external feedthrough 318. As shown, component 312 may be placed in package 506 such that the plane of component 312 may be parallel with the mounting surface. Accordingly, ribbon 304 may be looped and routed from component 312 such that it exits package 506 vertically, as seen with ribbon 202. The term "vertically" is defined as above. FIG. 6B shows a top view of the package 506 of FIG. 6A. As seen, the portion of ribbon 304 which is attached to component 312 is parallel with the component plane and as the remaining portion or segment of ribbon 304 is looped within package 506, ribbon 304 is preferably oriented vertically relative to the plane defined by component 312 as it leaves package 506.

Figure 7:
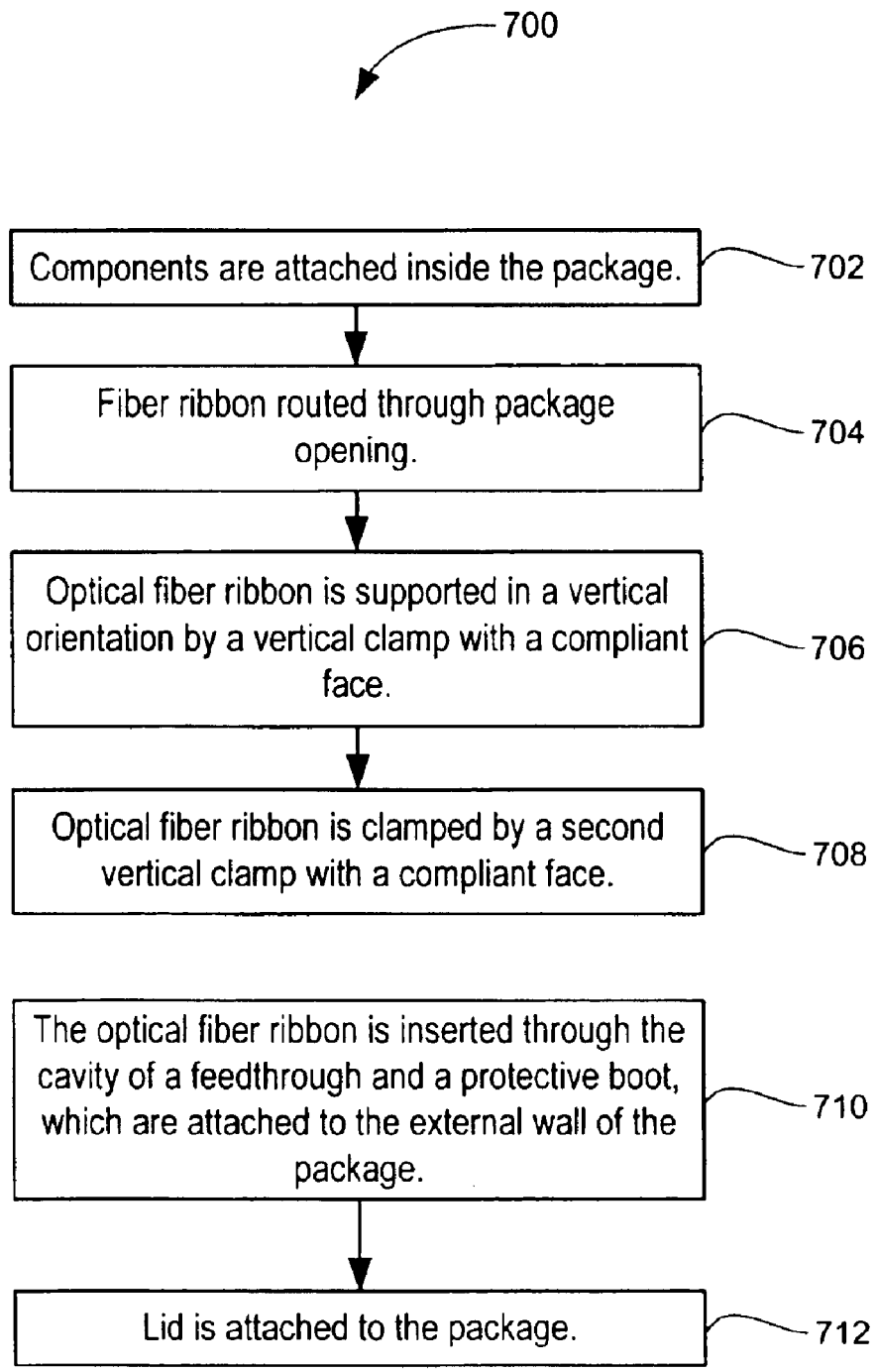
FIG. 7 shows a flow chart of a variation for vertically routing a segment of optical ribbon through a package wall opening.

FIG. 7 shows a flow chart 700 for one variation on vertically routing a segment of optical ribbon through a package wall opening. Starting in operation 702, components may be placed and attached inside a package. Operation 704 may follow, where an optical fiber ribbon may be routed through a package wall opening. Operation 706 may follow, where the optical fiber ribbon may be supported in a vertical orientation by, e.g., one flat-faced clamp covered by a compliant semi-rigid rubber strip. Operation 708 may follow, where, e.g., a second flat-faced clamp covered by a compliant semi-rigid rubber strip may be vertically clamped over the opposite side of the optical fiber ribbon and attached to the package body, e.g., by screws. Operation 710 may follow, where the optical fiber ribbon may be inserted through the cavity of a feedthrough and a protective boot, which may be attached to the external wall of the package. Operation 712 may follow, where the lid may be attached to the package.

Figure 8:
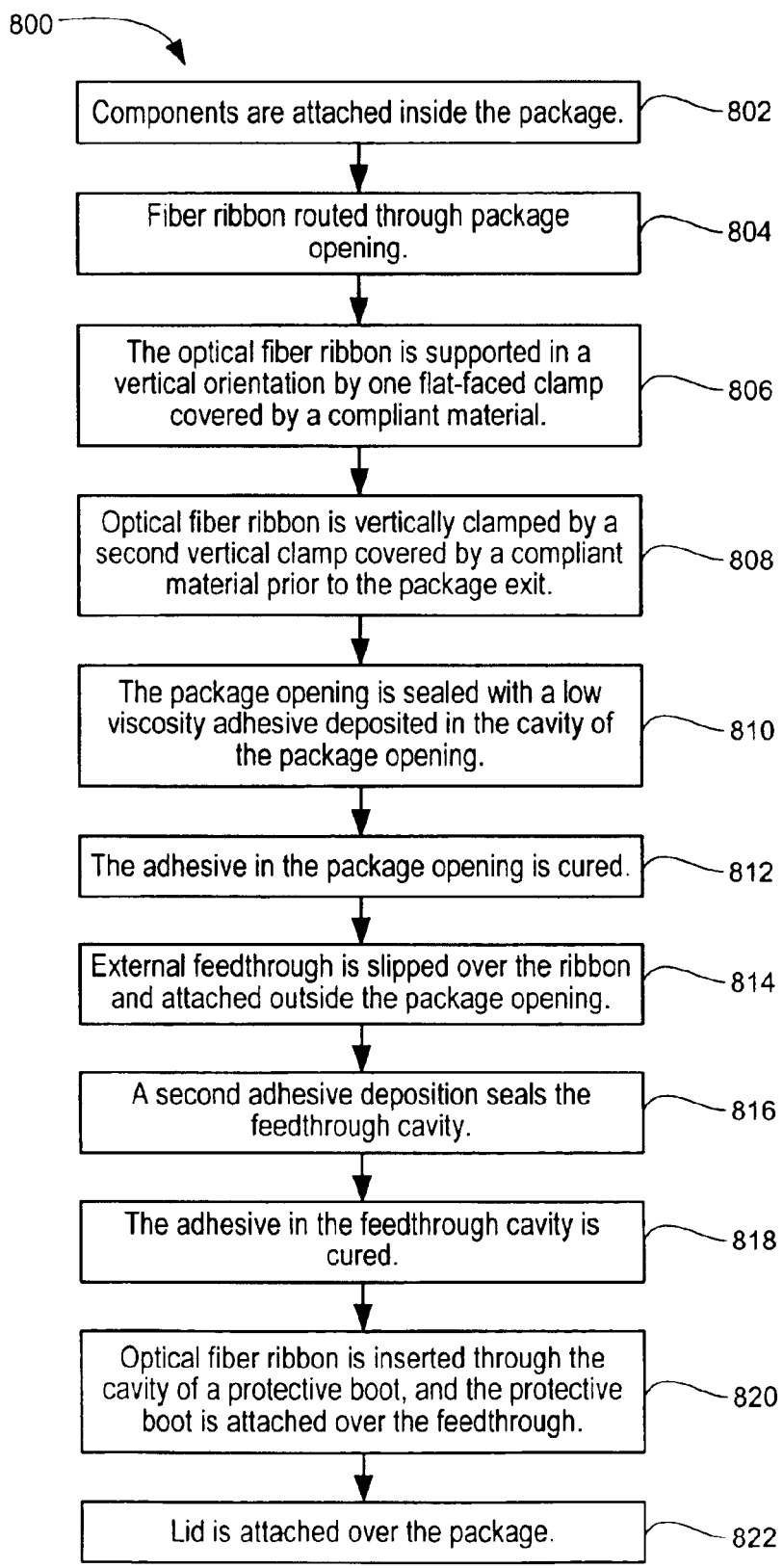
FIG. 8 shows a flow chart of a variation for sealing a segment of optical fiber ribbon vertically routed through a package wall opening.

FIG. 8 shows a flow chart 800 for another variation on sealing a segment of optical ribbon vertically routed through a package wall opening. Starting in operation 802, components may be placed and attached inside the package. Operation 804 may follow, where an optical fiber ribbon may be routed through a package wall opening. Operation 806 may follow, where the optical fiber ribbon may be supported in a vertical orientation by, e.g., one flat-faced clamp covered by a compliant semi-rigid rubber strip. Operation 808 may follow, where, e.g., a second flat-faced clamp covered by a compliant semi-rigid rubber strip is vertically clamped over the opposite side of the optical fiber ribbon and attached inside the package body, e.g., by screws, prior to the exit of the optical fiber ribbon from the package. Operation 810 may follow, where a low viscosity adhesive may be deposited in the cavity of the package wall opening to seal it. Operation 812 may follow, where the adhesive may be cured, e.g., thermally or by other methods. Operation 814 may follow, where the optical fiber ribbon may be inserted through the cavity of a feedthrough, which may then be attached to the external wall of the package. Operation 816 may follow, where a second adhesive deposition may seal the feedthrough cavity. Operation 818 may follow, where the second adhesive may be cured, e.g., thermally or by other methods. Operation 820 may follow, where the optical fiber ribbon may be inserted through the cavity of a protective boot, which may then be attached over the feedthrough. After all the package wall openings are sealed in this manner, operation 822 may follow, where a lid may be attached to the package.

Figure 9:
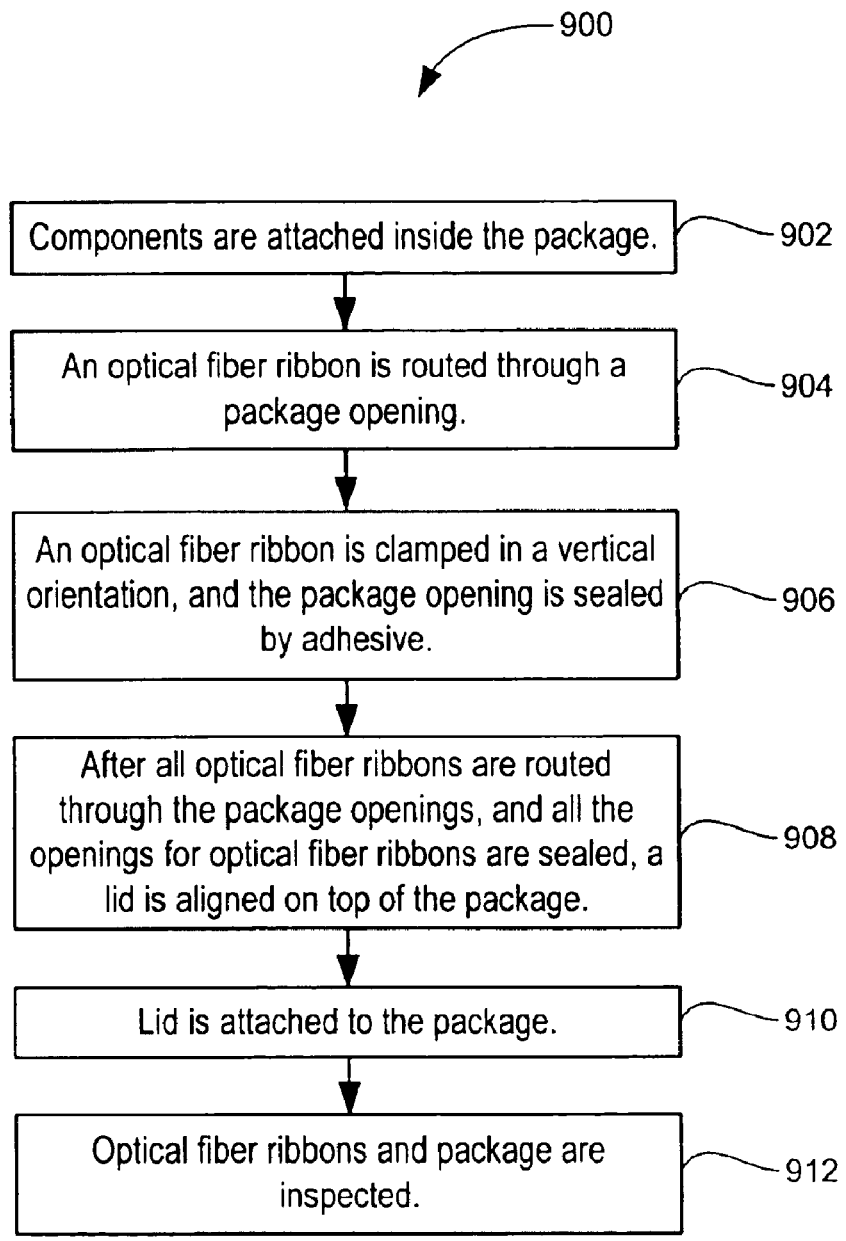
FIG. 9 shows a flow chart of another variation for sealing a segment of optical fiber ribbon, vertically routed through a package wall opening.

FIG. 9 shows a flow chart 900 for another variation on sealing a segment of optical fiber ribbon, vertically routed through a package wall opening. Operation 902 may begin where the components may be placed and attached inside the package. Operation 904 may follow, where a segment of an optical fiber ribbon may be routed through a package wall opening. Operation 906 may follow, where the optical fiber ribbon may be clamped in a vertical orientation, and an adhesive may be used to seal the package wall opening. After all the package wall openings are sealed in this manner, operation 908 may follow, where a lid may be aligned on the package. Operation 910 may follow, where the lid may be attached to the package. Operation 912 may follow, where the optical fiber ribbon and the package may then be inspected.

Figure 10:
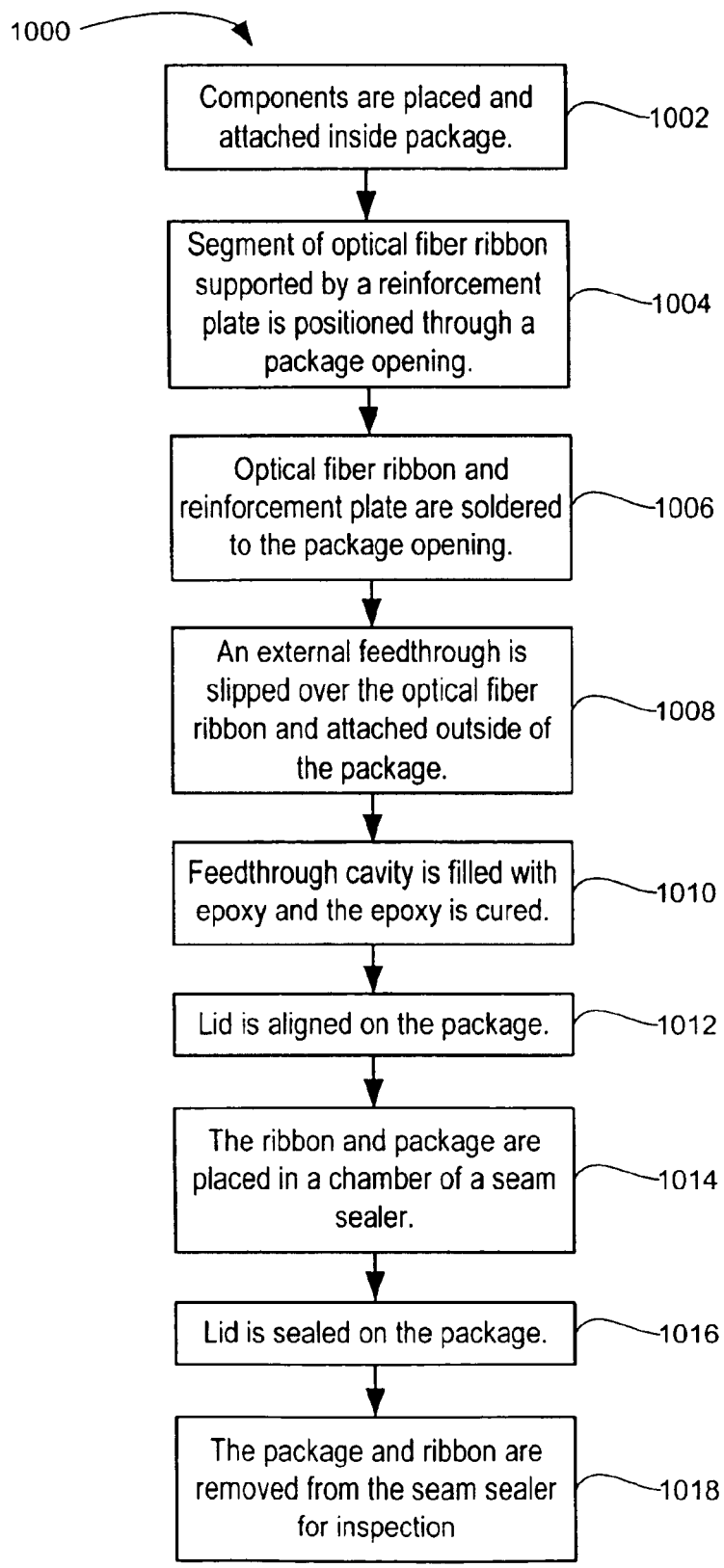
FIG. 10 shows a flow chart of a variation for hermetically sealing a segment of optical fiber ribbon, physically supported by a reinforcement plate, and vertically routed through a package wall opening.

FIG. 10 shows a flow chart 1000 for a variation on hermetically sealing a segment of optical fiber ribbon, physically supported by a reinforcement plate, and vertically routed through a package wall opening. Operation 1002 may begin where the components may be placed and attached inside the package. Operation 1004 may follow, where a segment of optical fiber ribbon supported by a reinforcement plate may be positioned through a package wall opening such that the reinforcement plate extends outside the package, most preferably by about 10 to 150 mils (0.0254 to 0.381 cm). Operation 1006 may follow, where the optical fiber ribbon and reinforcement plate may be soldered to the package wall opening. Operation 1008 may follow, where an external feedthrough may be slipped over the optical fiber ribbon and attached outside of the package. Operation 1010 may follow, where the feedthrough cavity may be filled with epoxy and the epoxy may be cured. After all the package wall openings are sealed in this manner, operation 1012 may follow, where a lid of low coefficient of thermal expansion material, e.g., Kovar, Invar, Alloy 42, or other low coefficient of thermal expansion alloys, may be aligned on the package. Operation 1014 may follow, where the ribbon and the package may be placed in a chamber of a seam sealer for a time ranging from about 30 minutes to 8 hours to seam seal the package. Operation 1016 may follow, where the lid may be sealed on the package. The seam sealer may use two electrodes that melt the lid in localized areas and seal the package. In the most preferred variation, sealing may take place in a dry box containing about 90% nitrogen and 10% helium. Helium may be used so that parts may be tested for fine leaks without having to pressurize them with helium after sealing. Operation 1018 may follow, where the optical fiber ribbon and package may be removed from the seam sealer. A further description may be found in the U.S. Patent Applications, which have been incorporated by reference in their entirety, as discussed above.

Descriptions of specific designs and dimensions are provided only as examples. It is to be understood that modifications to the variations will be readily apparent to those skilled in the art. Thus, while preferred variations of the invention have been disclosed, it will be readily apparent to those skilled in the art that the invention is not limited to the disclosed variations but is intended to cover numerous other modifications and broad equivalent arrangements that are included within the spirit and scope of the following claims.

What is claimed is:

1. An optical package having a length of optical fibers connected to the package, comprising:
    an enclosure comprising a mounting base which defines a plane and having at least one optical component disposed therein, the component defining a plane and being optically connected to the length of optical fibers; and
    an opening defined by at least one wall of the enclosure, the at least one wall defining a plane that is substantially perpendicular to the plane defined by the mounting base,
    wherein a segment of the length of optical fibers is disposed within the opening such that a plane defined by the segment is substantially perpendicular to the plane defined by the mounting base.

2. The package of claim 1 wherein the plane defined by the segment is perpendicular to the plane defined by the component.

3. The package of claim 1 further comprising a support attached to the enclosure and configured to support the segment of the length.

4. The package of claim 3 wherein the support comprises a clamp having a clamping face which is parallel to the segment of the length.

5. The package of claim 4 wherein a shape of the clamping face is selected from the group consisting of flat surfaces and curved surfaces.

6. The package of claim 4 wherein the clamp further comprises a compliant material disposed upon the clamping face.

7. The package of claim 6 wherein the compliant material comprises rubber.

8. The package of claim 6 wherein the compliant material comprises a thickness of about 0.030 in.

9. The package of claim 1 further comprising a feedthrough disposed within the opening and supporting the segment of the length.

10. The package of claim 9 wherein the feedthrough comprises a material selected from the group consisting of aluminum, aluminum alloys, and other metals.

11. The package of claim 9 further comprising a protective boot disposed over the feedthrough.

12. The package of claim 11 wherein the protective boot comprises a polymer selected from the group consisting of thermoset and thermoplastic polymers.

13. The package of claim 11 wherein the protective boot comprises a polymer selected from the group consisting of santoprene, neoprene, and ethylene propylene diene monomer.

14. The package of claim 1 further comprising a sealant disposed within a gap defined by the opening and the segment of the length.

15. The package of claim 14 wherein the sealant comprises an adhesive selected from the group consisting of anhydride epoxy, epoxy, silicone rubber, polymer adhesive, and solder.

16. The package of claim 1 further comprising a plate disposed within the opening and upon which the segment of the length is attached.

17. The package of claim 16 wherein the plate and the segment of the length are soldered together.

18. The package of claim 1 wherein the segment of the length of optical fibers is disposed within the opening such that a non-bending length of the optical fibers exterior to the opening is minimized.

19. The package of claim 18 wherein a bending radius of the length of optical fibers exterior to the opening is about 1.0 inch.

20. The package of claim 18 wherein the non-bending length of the optical fibers exterior to the opening is about 0.1 inch.

21. The package of claim 1 wherein the length of optical fibers has a cross-section selected from the group consisting of ovals, ellipses, and rectangles.

22. The package of claim 1 wherein the length of optical fibers comprise a ribbon of optical fibers.

23. A method of routing a length of optical fibers through a wall of a package comprising:

providing at least one optical component disposed within the package to which an end of the length of optical fibers is to be attached, the component defining a plane, and wherein the package comprises a mounting base defining a plane; and, routing the length of optical fibers through an opening defined in a wall of the package such that a plane defined by a segment of the length disposed within the opening is substantially perpendicular to the plane defined by the mounting base, wherein the wall of the package is substantially perpendicular to the plane defined by the mounting base.

24. The method of claim 23 further comprising securing the length of optical fibers to the package.

25. The method of claim 24 wherein securing the length of optical fibers to the package comprises clamping the length between at least two clamping members.

26. The method of claim 25 wherein the clamping members comprise a shape selected from the group consisting of flat surfaces and curved surfaces.

27. The method of claim 23 further comprising sealing a gap defined between the opening and the segment of the length.

28. The method of claim 27 wherein the gap is sealed with an adhesive selected from the group consisting of anhydride epoxy, epoxy, silicone rubber, polymer adhesive, and solder.

29. The method of claim 23 further comprising attaching the segment of the length to a reinforcement plate prior to routing the length of optical fibers through the opening.

30. The method of claim 29 wherein the reinforcement plate comprises a material selected from the group consisting of Kovar, Invar, and Alloy 42.

31. The method of claim 23 further comprising:

supporting the segment of the length with at least one feedthrough disposed within the opening; and filling a cavity defined in the feedthrough with an adhesive.

32. The method of claim 31 further comprising curing the adhesive.

33. The method of claim 23 further comprising bending a portion of the length of optical fibers exterior to the opening such that the portion of the length between the bent portion and the opening is minimized.

34. The method of claim 33 wherein a bending radius of the bent portion is about 1.0 inch.

35. The method of claim 33 wherein the length of the optical fibers between the bent portion and the opening is about 0.1 inch.

36. The method of claim 23 wherein the plane defined by the segment of the length disposed within the opening is perpendicular to the plane defined by the component.

37. The method of claim 23 wherein the length of optical fibers has a cross-section selected from the group consisting of ovals, ellipses, and rectangles.

38. The method of claim 24 wherein the length of optical fibers comprise a ribbon of optical fibers.

* * * * *